United States Patent
Song et al.

(10) Patent No.: US 10,353,274 B2
(45) Date of Patent: Jul. 16, 2019

(54) WATERPROOF CAMERA AND SUPPORTING STRUCTURE THEREOF

(71) Applicant: ZHEJIANG UNIVIEW TECHNOLOGIES CO., LTD, Zhejiang (CN)

(72) Inventors: Dantao Song, Zhejiang (CN); Guowei Li, Zhejiang (CN); Shuai Chen, Zhejiang (CN)

(73) Assignee: ZHEJIANG UNIVIEW TECHNOLOGIES CO., LTD, Zhejiang (CN)

( * ) Notice: Subject to any disclaimer, the term of this patent is extended or adjusted under 35 U.S.C. 154(b) by 0 days.

(21) Appl. No.: 15/573,483

(22) PCT Filed: Sep. 14, 2016

(86) PCT No.: PCT/CN2016/099038
§ 371 (c)(1),
(2) Date: Nov. 13, 2017

(87) PCT Pub. No.: WO2017/118089
PCT Pub. Date: Jul. 13, 2017

(65) Prior Publication Data
US 2018/0143513 A1    May 24, 2018

(30) Foreign Application Priority Data
Jan. 7, 2016  (CN) .................... 2016 2 0018079 U

(51) Int. Cl.
*G03B 17/08*  (2006.01)
*H04N 5/225*  (2006.01)
*H04N 7/18*   (2006.01)

(52) U.S. Cl.
CPC ............. *G03B 17/08* (2013.01); *H04N 5/225* (2013.01); *H04N 5/2251* (2013.01); *H04N 7/183* (2013.01)

(58) Field of Classification Search
CPC ...... G03B 17/08; H04N 5/225; H04N 5/2251; H04N 7/183
See application file for complete search history.

(56) References Cited

U.S. PATENT DOCUMENTS 5,224,675 A * 7/1993 Ellenberger ........... F16M 11/10
248/183.4
2005/0195282 A1  9/2005 Wei
(Continued)

FOREIGN PATENT DOCUMENTS

CN  102359700 A   2/2012
CN  202904183 U   4/2013
(Continued)

OTHER PUBLICATIONS

World International Property Organization, International Search Report issued in application No. PCT/CN2016/099038, dated Sep. 14, 2016, 4 pages.
(Continued)

*Primary Examiner* — Nelson D. Hernández Hernández
(74) *Attorney, Agent, or Firm* — JCIPRNET

(57) ABSTRACT

A waterproof camera and a supporting structure thereof are provided. The supporting structure includes a cylinder body and a pan-tilt platform. The cylinder body is configured to form a first cavity for holding a front end assembly. The pan-tilt platform is provided outside of the cylinder body, and includes a second cavity isolated from the first cavity. The first cavity is isolated from the second cavity. A protection level of the cylinder body may be up to IP67 to better isolate water vapor, while a protection level of the pan-tilt
(Continued)

platform may be up to IP66 to meet a waterproof demand of a transmission mechanism.

17 Claims, 4 Drawing Sheets

(56) References Cited

U.S. PATENT DOCUMENTS

2010/0067898 A1* 3/2010 Arbuckle ............... G03B 17/08
396/535
2011/0286735 A1* 11/2011 Tremblay ............. H04N 5/2252
396/427

FOREIGN PATENT DOCUMENTS

CN 204013834 U 12/2014
CN 205385532 U 7/2016

OTHER PUBLICATIONS

European Patent Office: European Search Report mailed in corresponding European Patent Application No. 16883219.4 dated Jun. 1, 2018 (7 pages).

* cited by examiner

WATERPROOF CAMERA AND SUPPORTING STRUCTURE THEREOF

CROSS-REFERENCE TO RELATED APPLICATION

This application is a 371 application of the International PCT application serial no. PCT/CN2016/099038, filed on Sep. 14, 2016, which claims the priority benefit of China application no. 201620018079.5, filed on Jan. 7, 2016. The entirety of each of the abovementioned patent applications is hereby incorporated by reference herein and made a part of this specification.

TECHNICAL FIELD

The present disclosure relates to a structural design of a camera and, in particular, to a waterproof camera and a supporting structure thereof.

BACKGROUND

A video monitor is used in many application scenarios for its richness and constitutes an important part of a security protection system. Monitor devices (such as cameras) in many video monitors are mounted outdoors. Since the humidity of outdoor air is high, if water vapor in the air enters a monitor device, the monitor device may run abnormally. Therefore, how to perform waterproof protection on a monitor device is of great importance.

A waterproof design of most of the existing cameras with a pan-tilt platform (hereinafter also referred to as pan-tilt platform cameras) is single-cavity waterproof. As shown in FIG. 1, a transmission mechanism and a front end assembly such as a Printed Circuit Board (PCB) (the front end assembly of the present disclosure refers to a camera component such as a PCB board and a lens that have higher requirements for protection level) are designed in a single cavity, and the cavity is then designed with a protection level of IP66. Specifically, when a camera is assembled, the camera is mounted by compressing a sealing ring at a bearing to seal the cavity so that the entire cavity may meet the protection level of IP66. However, since it is difficult to make sealing of the bearing perfect, water vapor may not be completely prevented from entering the cavity so as to possibly interfere with the PCB board and the lens provided in the cavity, for example, a hazing of the lens and a corrosion of the PCB board may occur so as to affect the operation of the monitor device.

SUMMARY

In view of the above, the present disclosure provides a waterproof camera and a supporting structure thereof with a better waterproof effect.

According to an aspect of the present disclosure, there is provided a supporting structure for a waterproof camera including:

a cylinder body configured to form a first cavity for holding a front end assembly; and a pan-tilt platform provided outside of the cylinder body, and including a second cavity isolated from the first cavity. By providing the first cavity and the second cavity which are isolated from each other, a protection level of the cylinder body may be up to IP67 to better isolate water vapor, while a protection level of the pan-tilt platform may reach IP66 to meet a waterproof demand of a transmission mechanism.

Optionally, the first cavity includes:

a cylinder body housing, and a sunshade sealed on the top of the cylinder body housing, wherein the sunshade and the cylinder body housing enclose the first cavity.

Optionally, the cylinder body housing includes a connecting portion for mounting a pan-tilt platform, which is used to connect with the pan-tilt platform.

Optionally, a sunshade sealing ring is provided between the cylinder body housing and the sunshade. An outlet is provided on the cylinder body, the outlet uses a cable waterproof connector, and a sealing layer is provided at the outlet. The protection level of the cylinder body may reach IP67 to better isolate water vapor.

Optionally, the pan-tilt platform includes:

a pan-tilt platform housing, a left bearing and a right bearing on the left and right sides of the pan-tilt platform housing, respectively, and a bottom cover provided below the pan-tilt platform housing, wherein the pan-tilt platform housing, the left bearing, the right bearing and the bottom cover enclose the second cavity.

Optionally, a bottom cover sealing ring is provided between the bottom cover and the pan-tilt platform housing, a right bearing sealing ring is provided between the right bearing and the pan-tilt platform housing, and a left bearing sealing ring is provided between the left bearing and the pan-tilt platform housing.

Optionally, the right bearing or the left bearing is provided with an outlet hole. The outlet hole is provided with a cable sealing ring. An inner ring of the cable sealing ring clings to a cable, and an interference fit exists between an outer ring of the cable sealing ring and an inner ring of the right bearing or the left bearing. Such that, a protection level of the pan-tilt platform may reach IP66 to meet a waterproof demand of a transmission mechanism.

Optionally, an outer ring of the right bearing is uniformly provided with a rib, and the right bearing sealing ring is socketed on the outer surface of the rib.

Optionally, the cylinder body includes: a connecting portion for mounting a pan-tilt platform; a right cover is provided to the outer surface of the right bearing; a left cover is provided to the outer surface of the left bearing; and the right cover and the left cover are connected with the connecting portion, respectively.

The present disclosure provides another supporting structure for a waterproof camera, including:

a cylinder body, including:

a cylinder body housing, and a sunshade sealed on the top of the cylinder body housing, wherein the cylinder body housing and the sunshade enclose a first cavity for holding a front end assembly, and a pan-tilt platform provided outside of the cylinder body housing, and including a second cavity isolated from the first cavity.

Optionally, the pan-tilt platform includes:

a pan-tilt platform housing, a left bearing and a right bearing on the left and right sides of the pan-tilt platform housing, respectively, and a bottom cover provided below the pan-tilt platform housing, wherein the pan-tilt platform housing, the left bearing, the right bearing and the bottom cover enclose the second cavity.

According to another aspect of the present disclosure, there is provided a waterproof camera, including:

a front end assembly, and the above supporting structure for a waterproof camera for holding the front end assembly.

In the present disclosure, the pan-tilt platform camera is divided into the first cavity formed by the cylinder body and the second cavity formed in the pan-tilt platform, and the two separate cavities are designed in a waterproof manner, respectively, so that the protection level of the cylinder body may reach IP67 to better isolate water vapor and to meet the waterproof demand of the front end assembly provided in the first cavity formed by the cylinder body. Moreover, the protection level of the pan-tilt platform may reach IP66 so as to ensure the waterproof security of the transmission mechanism in the pan-tilt platform.

BRIEF DESCRIPTION OF THE DRAWINGS

The drawings described herein are intended to provide a further understanding of the present disclosure, and form a part of the present disclosure. The illustrative embodiments of the present disclosure and its description are intended to be illustrative of the present disclosure and are not to be construed as limiting the present disclosure improperly.

DETAILED DESCRIPTION OF THE EMBODIMENTS

The technical solution in the embodiments of the present disclosure will be clearly and fully described in conjunction with the drawings in the embodiments of the present disclosure below. It will be apparent that the described embodiments are merely part of the embodiments of the present disclosure rather than all of the embodiments. All other embodiments obtained by those skilled in the art based on the embodiments of the present disclosure without making creative work fall within the scope of protection of the present disclosure.

In a cylinder camera with a pan-tilt platform which may be referred to as a pan-tilt platform camera hereinafter, a transmission mechanism and a front end assembly such as a PCB board have different waterproof demands. Specifically, a cylinder body for holding the front end assembly such as the PCB board has a more stringent waterproof demand, for example, requiring a protection level of IP67, while a pan-tilt platform for placing the transmission mechanism has a lower waterproof demand. Moreover, it is usually difficult to make the protection level of the bearing up to IP67. In view of this, the present disclosure proposes that the cylinder body may be separated from the pan-tilt platform and designed to be different cavities, and the two cavities are separately designed to be waterproof. In this way, the protection level of the cylinder body may reach IP67 to better isolate water vapor, while the protection level of the pan-tilt platform in may reach IP66 to meet the waterproof demand of the transmission mechanism.

Figure 1:
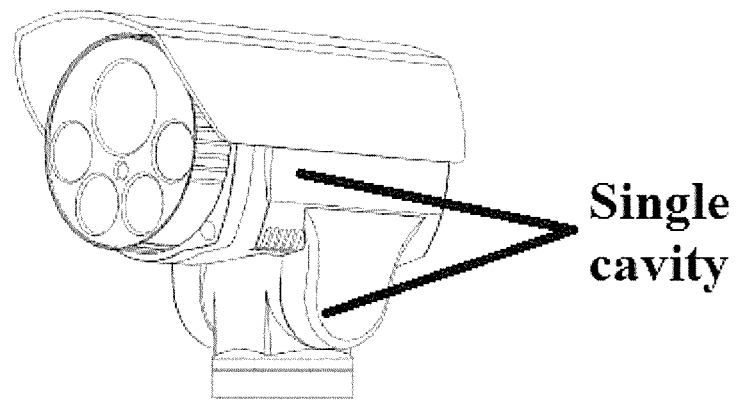
FIG. 1 is a schematic diagram of a structure of a pan-tilt platform camera in the prior art.
Figure 2:
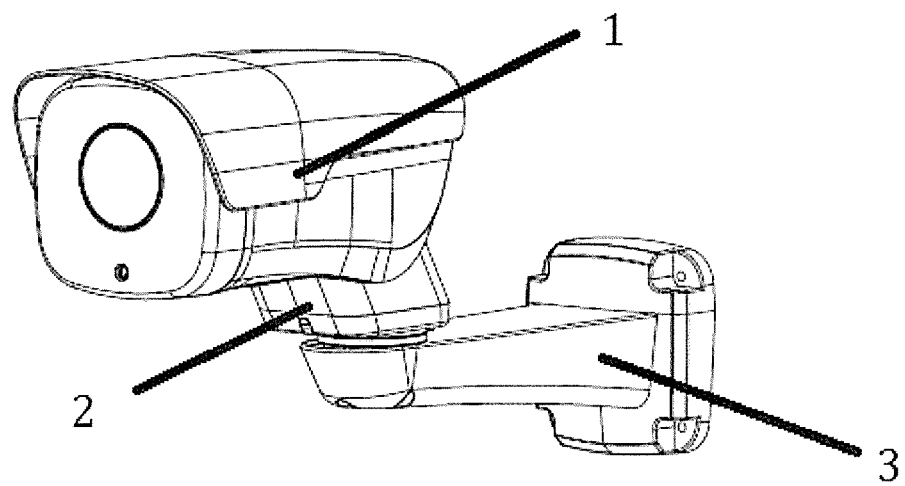
FIG. 2 is a schematic diagram of a supporting structure for a waterproof camera according to an embodiment of the present disclosure.

As shown in FIG. 2, an embodiment of the present disclosure provides a supporting structure for a waterproof camera, which may include a cylinder body 1, a pan-tilt platform 2 and a base 3. Where the cylinder body 1 and the base 3 are connected movably through the pan-tilt platform 2. The base 3 may be fixedly mounted on a wall body or other fixed facilities. The pan-tilt platform 2 may be mounted on the base 3 and drive the cylinder body 1 to rotate to achieve a monitoring cruise.

Figure 3:
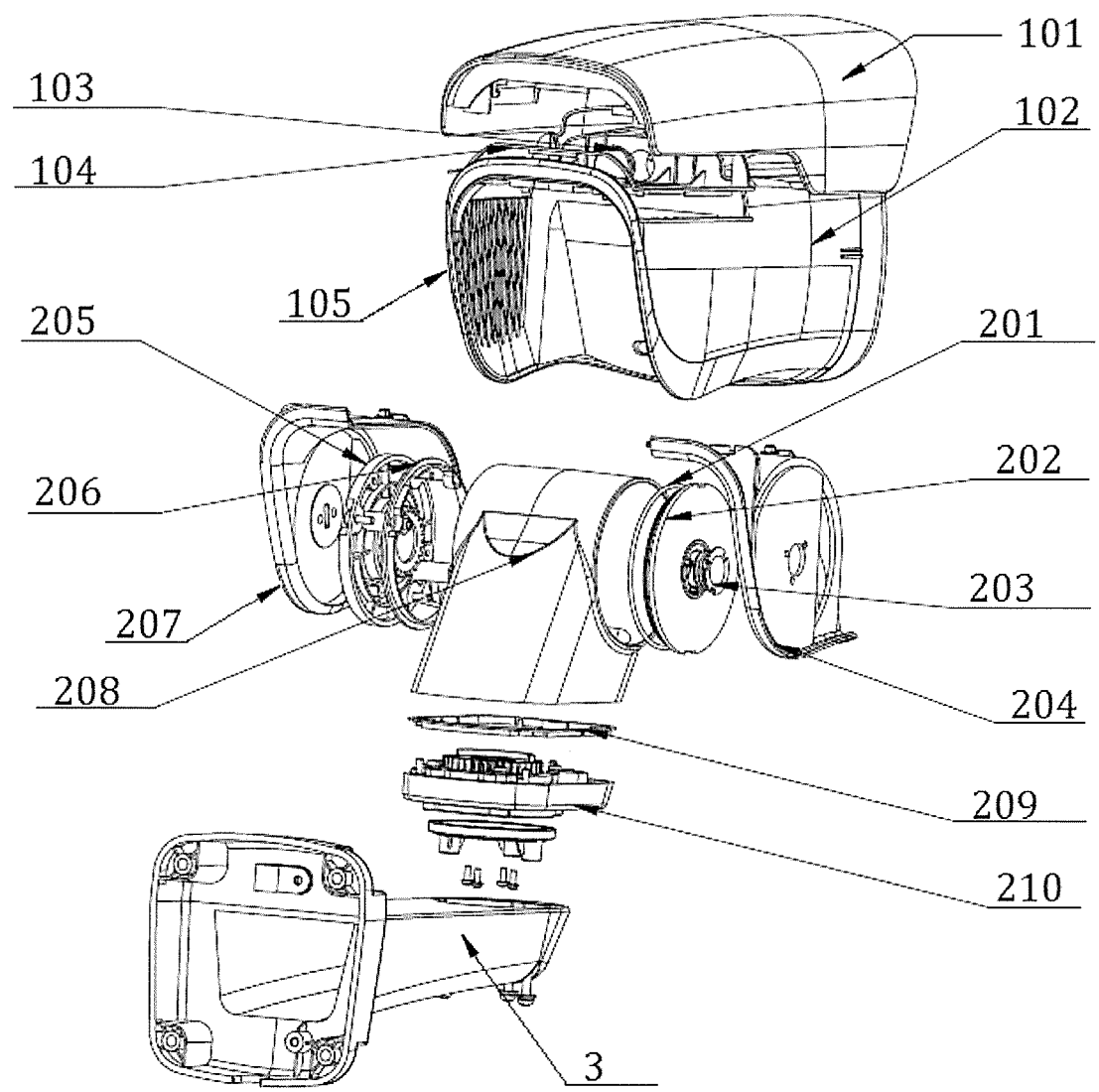
FIG. 3 is a stereoscopic exploded diagram of a supporting structure for a waterproof camera according to an embodiment of the present disclosure.

The cylinder body 1 is configured to form a first cavity 1 for holding a front end assembly. Specifically, as shown in FIG. 3, the first cavity 1 may include a sunshade 101 and a cylinder body housing 102. The sunshade 101 and the cylinder body housing 102 may be hermetically connected to form the first cavity 1. An outlet 103 may be provided on the cylinder body 1.

In another example, the cylinder body 1 may include a sunshade 101 and a cylinder body housing 102. The sunshade 101 and the cylinder body housing 102 may be hermetically connected to form the first cavity for holding the front end assembly. An outlet 103 may be provided on the cylinder body 1.

Herein the sunshade 101 and the cylinder body housing 102 may be sealed by a sunshade sealing ring 104. The outlet 103 may use a cable waterproof connector, and a sealing layer may be provided at the outlet 103 where the sealing layer may be achieved by a dispensing seal. In this way, the entire cylinder body 1 may be formed as a first cavity having a good sealing performance, for example, with the protection level of up to IP67, for protecting one or more front end assemblies including a lens, a PCB board, etc. provided in the first cavity.

The cylinder body 1 may include a connecting portion 105 for mounting the pan-tilt platform 2. A position of the connecting portion 105 may be set according to an actual situation. For example, the connecting portion 105 for mounting the pan-tilt platform 2 may be provided on the cylinder body housing 102. The connecting portion 105 may be provided at any place on the exterior of the cylinder body housing 102, and a specific position may be set according to an actual shape of the pan-tilt platform 2. For example, the connecting portion 105 may be provided below the rear part of the cylinder body housing 102. Specifically, the connecting portion 105 may be an opening and is not in communication with the first cavity 1. Therefore, in a case that the first cavity 1 is sealed, water vapor will not enter the first cavity through the connecting portion 105 connected with the pan-tilt platform 2. By providing the cylinder body 1 alone as the first cavity having a better sealing performance, the waterproof security of the front end assembly inside the first cavity may be ensured, thereby reducing the influence of design of the externally connected pan-tilt platform 2 on the waterproof performance of the first cavity.

The pan-tilt platform 2 may include a pan-tilt platform housing 208, a right cover 204, a right bearing 202, a right bearing sealing ring 201, a cable sealing ring 203, a left bearing 205, a left bearing sealing ring 206, a left cover 207, a bottom cover 210 and a bottom cover sealing ring 209.

Herein the right bearing 202 and the left bearing 205 are located on separate sides of the pan-tilt platform housing 208, respectively, and the bottom cover 210 may be provided below the pan-tilt platform housing 208. In this way, the pan-tilt platform housing 208, the right bearing 202, the left bearing 205 and the bottom cover 210 may enclose a second cavity that is isolated from the first cavity. According to an example, the bottom cover sealing ring 209 may be provided between the bottom cover 210 and the pan-tilt platform housing 208, the right bearing sealing ring 201 may be provided between the right bearing 202 and the pan-tilt platform housing 208, and the left bearing sealing ring 206 may be provided between the left bearing 205 and the pan-tilt platform housing 208. In this way, sealing performance of the second cavity may be further improved.

Herein the left bearing 205 may be a plastic integrated bearing, and the waterproof demand may be met between inner and outer rings thereof. The left bearing 205 may be fixed to the pan-tilt platform housing 208 by a fastener such as a screw.

The right bearing 202 may be a plastic integrated bearing. The inner and outer rings of the right bearing 202 may be mounted without using an additional part for switching due to the presence of flanges on both the inner and outer rings of the integrated bearing. The bottom cover sealing ring 209 may be mounted on the bottom cover 210, and the bottom cover 210 may be then connected with the pan-tilt platform housing 208 by a fastener such as a screw.

The right cover 204 may be provided to the outer surface of the right bearing 202, the left cover 207 may be provided to the outer surface of the left bearing 205, and the right cover 204 and the left cover 207 may be connected with the connecting portion 105, respectively, so that the pan-tilt platform 2 may be connected with the cylinder body 1.

Figure 5:
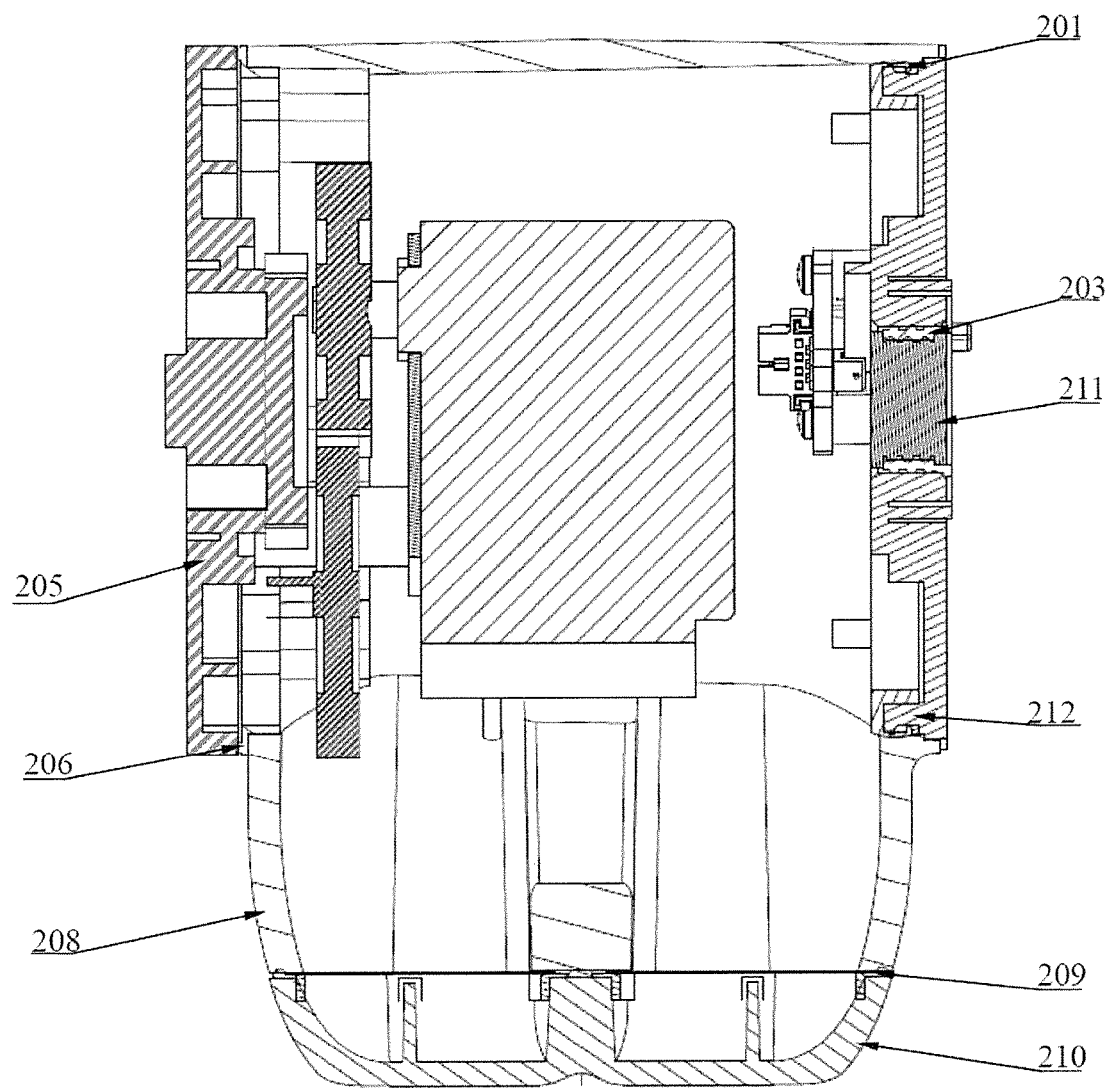
FIG. 5 is a cross-sectional diagram of a pan-tilt platform according to an embodiment of the present disclosure.

Further, as shown in FIG. 5, an outlet hole of a cable 211 may be provided on the right bearing 202 or the left bearing 205, and a cable sealing ring 203 may be provided at the outlet hole. For example, the outlet hole may be provided on the right bearing 202. Moreover, sealing may be achieved in such a way that an inner ring of the cable sealing ring 203 clings to the cable 211, an interference fit exists between an outer ring of the cable sealing ring 203 and the inner ring of the right bearing 202, and the right cover 204 compresses the cable sealing ring 203 firm.

Herein the outlet hole may be provided at a central position of the inner ring of the right bearing 202.

The cable sealing ring 203 may be a silicone ring. For example, the silicone ring may cling to the cable 211 and the cable 211 is forced into the outlet hole so that the cable 211 may be fixed to the inner ring of the right bearing 202 by use of elasticity of the silicone ring so as to not only meet the waterproof demand, but also facilitate mounting.

A rib 212 may be provided around the outer ring of the right bearing 202. The rib 212 may be uniformly distributed on the outer ring of the right bearing 202 and the rib 212 and the right bearing 202 may be integrally formed. An elastic right bearing sealing ring 201 may be socketed on the outer surface of the surrounding rib 212. The right bearing sealing ring 201 may be a silicone ring so that the right bearing 202 may be more securely mounted on the pan-tilt platform housing 208 by use of the elasticity of the right bearing sealing ring 201 when the right bearing 202 is compressed to the pan-tilt platform housing 208.

Figure 4:
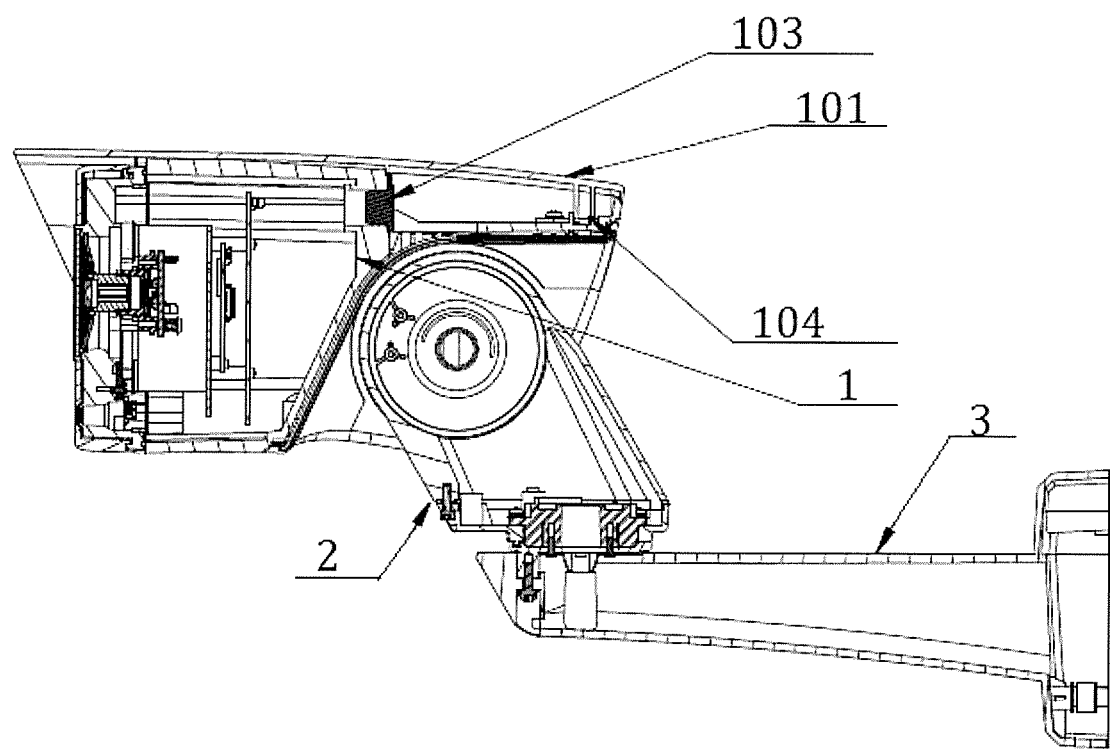
FIG. 4 is a cross-sectional diagram of a supporting structure for a waterproof camera according to an embodiment of the present disclosure.

As shown in FIG. 4, the pan-tilt platform 2 may be mounted on the base 3 through the bottom cover 210, and the pan-tilt platform 2 may also be mounted in the connecting portion 105 below the rear part of the cylinder body 1 via the left cover 207 and the right cover 204.

The second cavity is provided with one or more motors therein for driving the pan-tilt platform 2 to rotate, which may include a horizontal rotation motor and a vertical rotation motor. In general, the vertical rotation motor may be mounted on the left cover 207, and the horizontal rotation motor may be mounted on the bottom cover 210. In this way, the horizontal rotation motor may drive the pan-tilt platform 2 to rotate horizontally, and the vertical rotation motor may drive the left bearing 202 and the right bearing 205 to rotate thereby driving the cylinder body 1 to rotate vertically.

It should be noted that the outlet hole may be provided on the right bearing 202 or may be provided on the left bearing 205 depending on the position of the vertical motor, which will not be described here.

It is also to be noted that the first cavity and the second cavity may not be limited to being provided in the cylinder body 1 and the pan-tilt platform 2 which are independent of each other, respectively, so long as the first cavity may not be in communication with the second cavity. For example, the cylinder body 1 and the pan-tilt platform 2 may be integrally provided, and the first cavity is not in communication with the second cavity.

In the present disclosure, the first cavity and the second cavity are separate and are separately designed to be waterproof so that the protection level of the cylinder body 1 may be up to IP67 and the protection level of the pan-tilt platform 2 may be up to IP66. The dual-cavity structure may effectively meet the IP67 protection demand of a lens and a PCB board, as compared to the design of a single cavity.

The present disclosure also provides a waterproof camera including a front end assembly and the above supporting structure for a waterproof camera for mounting the front end assembly.

The devices provided in the embodiments of the present disclosure have been described in detail herein above. The principles and implementation of the present disclosure have been described in specific examples herein. The description of the above embodiments is merely for helping understand the method and the core idea of the present disclosure; at the same time, there will be variations in the implementation and the scope of application made by those skilled in the art in accordance with the idea of the present disclosure. In summary, the present specification is not to be construed as limiting the present disclosure.

What is claimed is:

1. A supporting structure for a waterproof camera, comprising:
   a cylinder body configured to form a first cavity for holding a front end assembly; and
   a pan-tilt platform provided outside of the cylinder body and comprising a second cavity isolated from the first cavity, wherein the pan-tilt platform comprises:
   a pan-tilt platform housing;
   a left bearing and a right bearing on left and right sides of the pan-tilt platform housing, respectively; and
   a bottom cover provided below the pan-tilt platform housing,
   wherein the pan-tilt platform housing, the left bearing, the right bearing and the bottom cover enclose the second cavity.

2. The supporting structure according to claim 1, wherein the first cavity comprises:
   a cylinder body housing; and
   a sunshade sealed on the top of the cylinder body housing,
   wherein the sunshade and the cylinder body housing enclose the first cavity.

3. The supporting structure according to claim 2, wherein a sunshade sealing ring is provided between the cylinder body housing and the sunshade.

4. The supporting structure according to claim 1, wherein an outlet is provided on the cylinder body,
   the outlet uses a cable waterproof connector, and
   a sealing layer is provided at the outlet.

5. The supporting structure according to claim 1, wherein
a bottom cover sealing ring is provided between the bottom cover and the pan-tilt platform housing,
a right bearing sealing ring is provided between the right bearing and the pan-tilt platform housing, and
a left bearing sealing ring is provided between the left bearing and the pan-tilt platform housing.

6. The supporting structure according to claim 5, wherein the right bearing or the left bearing is provided with an outlet hole and the outlet hole is provided with a cable sealing ring, wherein
an inner ring of the cable sealing ring clings to a cable, and an interference fit exists between an outer ring of the cable sealing ring and an inner ring of the right bearing or the left bearing.

7. The supporting structure according to claim 6, wherein
an outer ring of the right bearing is uniformly provided with a rib, and
the right bearing sealing ring is socketed on the outer surface of the rib.

8. The supporting structure according to claim 5, wherein
the cylinder body comprises a connecting portion for mounting the pan-tilt platform,
a right cover is provided to the outer surface of the right bearing,
a left cover is provided to the outer surface of the left bearing, and
the right cover and the left cover are connected with the connecting portion, respectively.

9. A waterproof camera, comprising:
a front end assembly; and
a supporting structure for holding the front end assembly, comprising:
  a cylinder body configured to form a first cavity for holding a front end assembly; and
  a pan-tilt platform provided outside of the cylinder body and comprising a second cavity isolated from the first cavity, wherein the pan-tilt platform comprises:
    a pan-tilt platform housing;
    a left bearing and a right bearing on the left and right sides of the pan-tilt platform housing, respectively; and
    a bottom cover provided below the pan-tilt platform housing,
    wherein the pan-tilt platform housing, the left bearing, the right bearing and the bottom cover enclose the second cavity.

10. The waterproof camera according to claim 9, wherein the first cavity comprises:
a cylinder body housing; and
a sunshade sealed on the top of the cylinder body housing, wherein the sunshade and the cylinder body housing enclose the first cavity.

11. The waterproof camera according to claim 10, wherein a sunshade sealing ring is provided between the cylinder body housing and the sunshade.

12. The waterproof camera according to claim 9, wherein
an outlet is provided on the cylinder body,
the outlet uses a cable waterproof connector, and
a sealing layer is provided at the outlet.

13. The waterproof camera according to claim 9, wherein
a bottom cover sealing ring is provided between the bottom cover and the pan-tilt platform housing,
a right bearing sealing ring is provided between the right bearing and the pan-tilt platform housing, and
a left bearing sealing ring is provided between the left bearing and the pan-tilt platform housing.

14. The waterproof camera according to claim 13, wherein the right bearing or the left bearing is provided with an outlet hole and the outlet hole is provided with a cable sealing ring, wherein
an inner ring of the cable sealing ring clings to a cable, and
an interference fit exists between an outer ring of the cable sealing ring and an inner ring of the right bearing or the left bearing.

15. The waterproof camera according to claim 14, wherein
an outer ring of the right bearing is uniformly provided with a rib, and
the right bearing sealing ring is socketed on the outer surface of the rib.

16. The waterproof camera according to claim 13, wherein
the cylinder body comprises a connecting portion for mounting the pan-tilt platform,
a right cover is provided to the outer surface of the right bearing,
a left cover is provided to the outer surface of the left bearing, and
the right cover and the left cover are connected with the connecting portion, respectively.

17. A supporting structure for a waterproof camera, comprising:
a cylinder body, comprising:
  a cylinder body housing; and
  a sunshade sealed on the top of the cylinder body housing, wherein the cylinder body housing and the sunshade enclose a first cavity for holding a front end assembly; and
a pan-tilt platform provided outside of the cylinder body housing and comprising a second cavity isolated from the first cavity, wherein the pan-tilt platform comprises:
  a pan-tilt platform housing;
  a left bearing and a right bearing on left and right sides of the pan-tilt platform housing, respectively; and
  a bottom cover provided below the pan-tilt platform housing,
  wherein the pan-tilt platform housing, the left bearing, the right bearing and the bottom cover enclose the second cavity.

* * * * *